June 23, 1942.  W. R. WEEKS  2,287,584
COFFEE MAKER
Filed Dec. 10, 1940  2 Sheets-Sheet 1
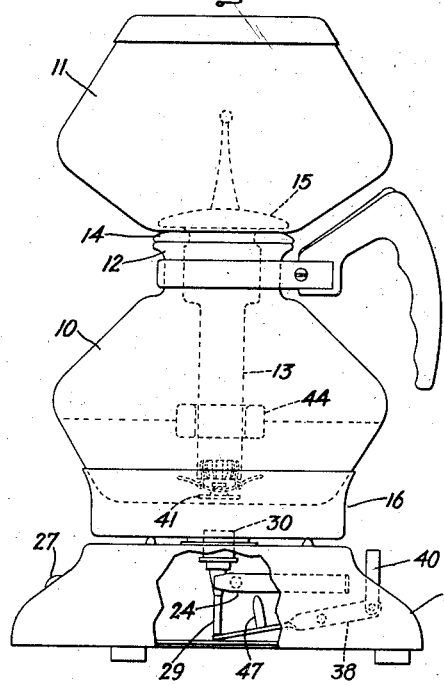
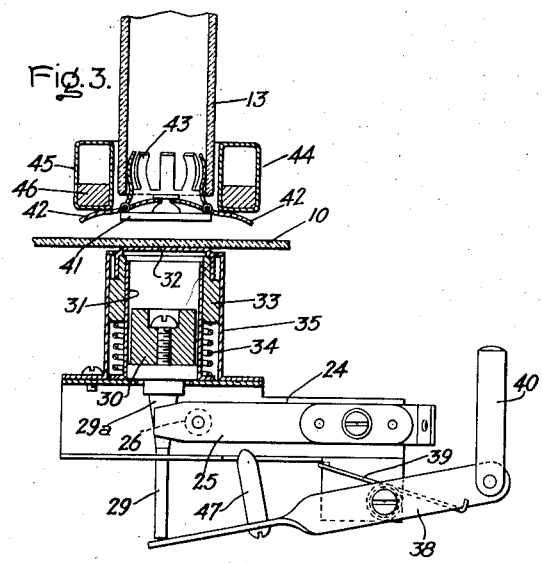
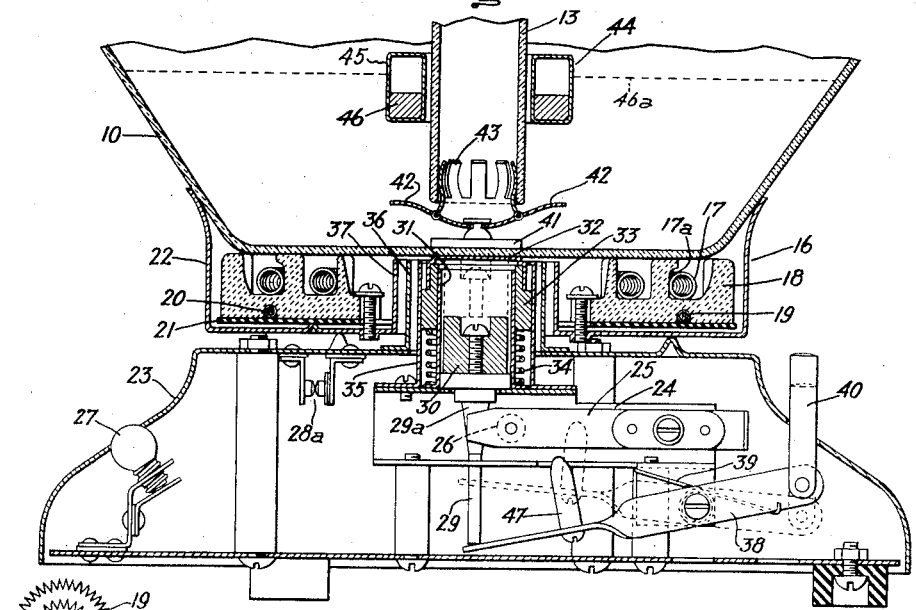
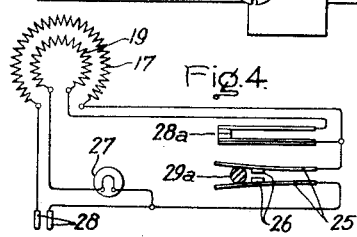
Inventor:
Walter R. Weeks,
by Harry E. Dunham
His Attorney.

June 23, 1942.   W. R. WEEKS   2,287,584
COFFEE MAKER
Filed Dec. 10, 1940   2 Sheets-Sheet 2

Inventor:
Walter R. Weeks,
by Harry E. Dunham
His Attorney.

Patented June 23, 1942

2,287,584

UNITED STATES PATENT OFFICE 2,287,584

COFFEE MAKER

Walter R. Weeks, Hamden, Conn., assignor to General Electric Company, a corporation of New York Application December 10, 1940, Serial No. 369,409

10 Claims. (Cl. 219—43)

This invention relates to coffee makers, more particularly to coffee makers of the vacuum-type wherein heated water is transferred from a water heating receptacle to a coffee infusion receptacle where the brew is made and the liquid then forced into the water heating receptacle when the heat applied thereto has been reduced sufficiently; and it has for its object the provision of an improved device of this character.

In one of its aspects, this invention contemplates the provision of an improved coffee maker of this character which in a simplified and improved manner automatically reduces the heat applied to the water heating receptacle after the water has been transferred to the infusion receptacle so that the brew is automatically caused to flow into the water heating receptacle. This invention relates particularly to the coffee maker described and broadly claimed in my copending application, Serial No. 357,256, filed September 18, 1940, and assigned to the same assignee as this invention. There control means for the coffee maker is provided which is operated responsively to the flow of water out of the water heating bowl into the coffee infusion bowl so as to reduce the heat applied to the water heating bowl when substantially the entire quantity of water has been transferred; more specifically, a magnet and associated armature are controlled by the flow of water out of the water heating bowl so that they are caused to move relatively to each other to effect the reduction in heat applied to the bowl when the water has been transferred. My present invention contemplates a different means for effecting the relative movement between the magnet and its armature than described and claimed in this copending application. And in a broader aspect it contemplates the provision of means operated by the movement of a float in the water heating bowl for effecting the reduction in heat applied to the water heating bowl.

In one form of this invention, the float is caused to operate the armature when the water falls to a predetermined low level in the water heating bowl to effect the movement between the armature and magnet to control the heater to reduce heat applied to the water heating bowl.

Figure 5:
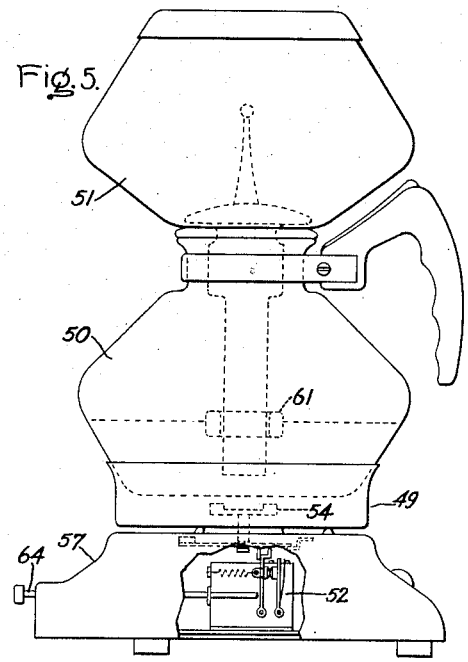
Figure 6:
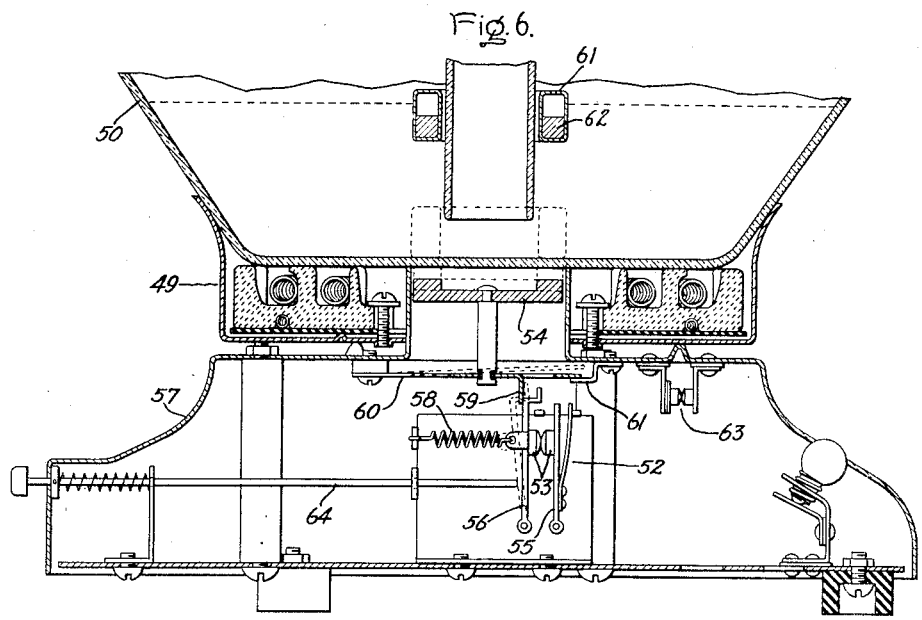

For a more complete understanding of this invention, reference should be had to the accompanying drawings in which Fig. 1 is a vertical elevation of a vacuum-type coffee maker embodying this invention, parts being broken away so as to illustrate certain details of construction; Fig. 2 is a fragmentary sectional view taken through a part of the apparatus shown in Fig. 1 and on a larger scale than Fig. 1; Fig. 3 is a fragmentary elevation of a part of the mechanism shown in Fig. 2, but illustrating said elements in different operative positions; Fig. 4 is a diagrammatic representation showing heating means for the stove of the coffee maker and certain control elements therefor arranged in accordance with this invention; Fig. 5 is an elevation of a vacuum-type coffee maker of modified form arranged in accordance with this invention, a part being broken away so as to illustrate certain details of construction; and Fig. 6 is an enlarged fragmentary sectional view of a part of the apparatus shown in Fig. 5.

Referring more particularly to Figs. 1 to 4 inclusive, this invention has been shown as applied to a vacuum-type coffee maker such as described and claimed in my above-mentioned copending application. This coffee maker comprises a lower water heating bowl 10 and an upper coffee infusion bowl 11. The lower bowl 10 is provided at its upper end with an upright neck 12 within which a depending liquid transfer tube 13 provided on the lower end of the upper bowl 11 is received. A suitable gasket 14 is inserted in the neck 12 about the depending tube 13. As shown, the lower end of the tube 13 terminates just above the bottom wall of the lower bowl 10. Seated within the bottom of the coffee infusion vessel 11 over the mouth of the tube 13 is a suitable filter 15. It will be observed that the vertical central axes of the two bowls 10 and 11 and of the tube 13 are substantially coincident.

It will be understood that in the operation of coffee makers of this character water is placed within the bowl 10, while the coffee grounds are placed in the bowl 11 above the filter 15. When the water in the bowl 10 is heated, a pressure is created above the liquid level and eventually this pressure becomes so great that it forces the water through the transfer tube 13 into the infusion vessel 11 where the coffee grounds are steeped. When the heat is removed from the lower bowl, the bowl cools and the water vapor therein condenses to create a vacuum to cause the coffee brew in the bowl 11 to pass through the filter 15 into the lower bowl.

The two bowls 10 and 11 are supported by a stove 16 which is arranged to apply heat to the bottom wall of the bowl 10. The stove 16 comprises a helical resistance conductor 17 mounted in a groove 17a provided for it in a suitable supporting brick 18. Also mounted on the brick 18 is a relatively high resistance temperature maintaining unit 19. As shown, the unit 19 is mounted in a groove 20 provided for it in the bottom of the brick and the groove is covered by an electrically insulating sheet 21. The brick 18 is housed in a pan-like casing 22. This casing 22 in turn is mounted upon a hollow base 23.

The heating resistances 17 and 19 are controlled responsively to the transfer of liquid from the water heating bowl 10 to the coffee infusion bowl 11 so that after the water has been transferred to the bowl 11, the heat applied to the bowl 10 is reduced sufficiently to cause the return of the liquid to the bowl 10 after the brew has been prepared. These resistances are controlled by means of a switch having a pair of parallel switch arms 25. These switch arms carry cooperating contacts 26 which are biased together by the resiliency of the switch arms. As shown in Fig. 4, these contacts control the energizing circuit of the resistances 17 and 19.

Preferably, a suitable signal lamp 27 will be provided to give an indication when the coffee brew has been made. As shown in Fig. 4, this lamp is connected in series with the temperature maintaining unit 19.

The heating units 17 and 19 and the signal lamp 27 are electrically supplied by a pair of terminal pins 28. When the switch contacts 26 are closed and the terminals are energized, the main heater 17 will be connected to the terminals to provide a high heat, while the unit 19 and the lamp 27 will be shorted out of the circuit, and when the contacts are open, the units 17 and 19 will be connected in series to the terminals to provide a low temperature maintaining heat. At this time the signal lamp 27 will be connected in series with the resistances. Connected in the circuit of the temperature maintaining unit 19 is a temperature responsive switch 28a whose function will be described in greater detail hereinafter.

The switch blades 25b are controlled by means of a plunger 29 which is mounted for vertical movement in the central vertical axis of the stove, which axis it will be observed is coincident with the vertical axes of the bowls 10 and 11 and of the tube 13. The plunger 29 is provided at the top with an enlarged tapered section 29a which, when the plunger moves downwardly as viewed in Fig. 2, engages the switch arms to separate them to open the contacts 26, whereas when the plunger is elevated the enlarged section is removed from the switch arms so as to permit them to close the contacts 26.

Rigidly secured to the upper end of the plunger is a cylindrical permanent magnet 30 which is mounted for vertical movement in a suitable fixed cylindrical casing 31, which is mounted in the center of the stove 16. The cylinder 31 is covered by means of a suitable cap 32 which is secured to a bushing 33 fitted around the cylinder. This bushing is biased upwardly by means of a compression spring 34 so that it is forced firmly against the bottom of the bowl 10 when the bowl is placed upon the stove, as shown in Figs. 1 and 3. Surrounding the bushing is a fixed casing 35 and surrounding this in turn are spaced fixed cylindrical members 36 and 37.

It will be observed that when the magnet 30 is in its lower position, shown in Fig. 2, the plunger 29 will be in its lower position to hold the switch contacts 26 open. The plunger and magnet are elevated to permit the contacts to close by means of a manually operable lever 38.

This lever is biased in a counter-clockwise direction, as viewed in Fig. 2 to its solid line position of this figure by means of a spring 39. It is moved in a clockwise direction against the bias of this spring by means of a manually operable plunger 40 connected to the lever as shown. It will be observed by reference to Fig. 2 that when the plunger 40 is depressed it will move the lever 38 from its solid line position of Fig. 2 to its dotted line position of this figure, and when the lever is so moved it will elevate the plunger 29 and the magnet 30 until the magnet engages the under side of the cap 32. Thus far, the stove structure is the same as that described and claimed in my above-mentioned copending application.

The magnet 30 is held in its upper position against the cap 32 by means of an armature 41 which is adapted to rest upon that section of the inside bottom wall of the bowl 10 directly above the magnet. As shown, the armature 41 is mechanically connected to the lever arms 42 which in turn are pivoted upon a spring socket member 43 which is inserted in the lower end of the transfer tube 13.

It will be observed that as long as the armature 41 rests upon the bottom wall of the bowl 10, it will be attracted to the magnet 30 so as to hold the magnet in its upper position with the switch contacts 26 closed once the magnet has been moved to this position. Should the armature 41 be elevated, however, the magnet can no longer attract itself to the armature and it will then fall so as to open the switch contacts 26 and thereby reduce the heat applied to the bowl 10.

The armature 41 is automatically elevated to release the magnet when substantially all of the water has been forced from the lower bowl 10 by means of a float 44. The float 44, as shown, comprises an annular casing 45 which surrounds the tube 13. This casing is weighted by an annular metallic member 46 so as to occupy its position with reference to the water level 46a shown in Fig. 2. The float is so constructed and arranged that when it falls as the level of the water in the bowl 10 falls it will engage the levers 42 to move them from their positions shown in Fig. 2 to their positions shown in Fig. 3 when substantially all of the water has been transferred. This, as shown, elevates the armature 41 to release the magnet to reduce the heat in the manner previously described.

It is desirable to prevent the immediate energization of the temperature maintaining circuit upon the transfer of the water to the vessel 11 by delaying it somewhat so as to permit the coffee brew to move into the bowl 10 before a warming heat is applied to this bowl. In order to provide for this delay the thermostatic switch 28a is provided and connected as previously described. This thermostatic switch is heated up when the main heater unit 17 is energized and opens its contacts while the water is being transferred to the bowl 11; it does not reclose these contacts until after the stove has cooled sufficiently to permit the coffee brew to return to the lower bowl.

Rigidly secured to the lever 38 is a pin 47 which, when the manually operable plunger 40 is depressed, moves upwardly between the switch arms to hold them temporarily open until the magnet 30 has been secured in its upper position by its armature 41, and until the lever 38 is returned to its initial position shown in Fig. 2. This prevents anyone from holding the plunger 40 down in its lower position and operating the stove 16 as a hot plate for miscellaneous purposes. Also, if the pin 47 were omitted, it is possible that when coffee bowls are heated upon the stove but without the armature 41 in place, one might depress and release the plunger 40 very slowly, in which case it is possible that the switch arms 25 might retain the magnet 30 in a partially elevated position with the contacts 26 touching each other. This of course would leave the stove energized with the likelihood that the glassware and stove might become so hot as to be destroyed.

In the operation of this coffee maker, it will be understood that when the water has been placed in the bowl 10 and the coffee grounds in the bowl 11, the plunger 40 will be depressed to elevate the magnet 30 where it will be held by the armature 41. This energizes the heating element 17 and applies high heat to the bowl 10. When the water has been heated sufficiently, it is transferred through the tube 13 to the bowl 11 and when the water has been substantially transferred, the float 44 drops and elevates the armature 41 to release the magnet 30. The magnet falls so as to open the switch contacts 26 and to condition the temperature maintaining circuit. During this interval of time, however, the thermostat 28a will have moved to its open position so as to prevent the energization of the temperature maintaining circuit until the stove has cooled down sufficiently to first cause the coffee brew to return to the bowl 10. Only after this has happened does the thermostat 28a cool sufficiently to close its contacts and thereby establish the temperature maintaining circuit wherein the resistances 17 and 19 are connected in series. This heater circuit will be maintained as long as the terminals are energized.

In the form of my invention shown in Figs. 5 and 6, the magnet is elevated at the termination of the liquid transfer period to cut off the heat, rather than raised initially to start the coffee making operation, as in the first form described. Here, the stove structure 49 is substantially the same as that previously described, and so are the structures of the water heating bowl 50 and infusion bowl 51.

However, in this case a switch 52 is provided having cooperating contacts 53 corresponding to the contacts 26 of the first form, which are maintained closed by a magnetic member 54. As shown, the contacts 53 are mounted upon rigid switch arms 55 and 56 that are pivotally mounted in the base 57 of the stove. A tension spring 58 biases the contact arm 56 toward the left, as viewed in Fig. 6, so as to tend to separate the contacts 53. The arm 56, however, is latched in a switch closing position by a latching member 59 which is mounted upon a flexible arm 60. The arm 60 is held against a suitable stop 61 to hold the arm 56 in its switch closing position by the magnet 54.

In this case, the float 61 is weighted by an armature 62 of annular form, and which preferably will be formed of soft iron. It will be observed that when the float falls responsively to the drop in the liquid level in the bowl 50, the armature 62 will be moved to the bottom wall of the bowl 50 directly above the magnet 54. When the armature arrives at this position, the magnet is attracted to the armature and is drawn upwardly against the bottom of the bowl 50. This elevates the latch 59 and permits the arm 56 to move to the left under the influence of the spring 58 to open the contacts 53. When this happens, a temperature warming circuit is conditioned as in the first case, but it is prevented from applying the warming heat until the thermostat 63 has cooled sufficiently, as fully described in the case of the first form. The latch and magnet will thereafter be held in their upper positions by the switch arm 56.

When it is desired to start a coffee making operation, the arm 56 is manually forced to the right to close the contacts 53 by means of a plunger 64.

While I have shown particular embodiments of my invention, it will be understood, of course, that I do not wish to be limited thereto since many modifications may be made and I, therefore, contemplate by the appended claims to cover any such modifications as fall within the true spirit and scope of my invention.

What I claim as new and desire to secure by Letters Patent of the United States is:

1. A coffee maker comprising a water heating bowl, a liquid transfer tube leading from said bowl through which the water is forced when it is heated, means for heating said bowl, a pair of relatively movable cooperating control members for said heating means consisting of a magnet and an armature constructed and arranged to control said heating means to apply heat to said bowl when said members are moved to first predetermined positions relative to each other and to reduce the heat applied when moved to second predetermined positions relative to each other, the magnet functioning to maintain said members in said first relative positions, one of said members being mounted in said bowl, and a float in said bowl constructed and arranged to engage said one member when the liquid level in said bowl falls to a predetermined low level for moving it from the other member to cause said members to move to said second positions and thereby reduce the heat applied to said bowl.

2. A coffee maker comprising a water heating bowl, a liquid transfer tube leading from said bowl through which the water is forced when it is heated, means for heating said bowl, a pair of relatively movable cooperating control members for said heating means consisting of a magnet and an armature constructed and arranged to control said heating means, one of said members being mounted in said bowl for movement toward and away from a section of the wall of said bowl and the other mounted outside of said bowl for movement toward and away from said section, the position of the member in said bowl controlling the movement of said member outside of said bowl, a float in said bowl for controlling the position of said member in said bowl in accordance with the water level in said bowl so as to cause movement of said other member when said water has been substantially transferred from said bowl, and means operated responsively to the movement of said other member controlling said heating means to reduce the application of heat to said bowl.

3. In a vacuum-type coffee maker having a water heating bowl, a coffee infusion bowl and a water transfer tube between them having one end terminating at a point adjacent the lower wall of the water heating bowl, an electric heater under said water heating bowl for applying heat to the liquid in said bowl, a switch controlling the energization of said heater, a pair of relatively movable cooperating control members for said switch consisting of a magnet and an armature constructed and arranged to control the operation of said switch so that when said magnet and armature are attracted toward each other said switch is closed and when they are separated said switch is opened, one of said members constructed and arranged to rest on said bottom wall and the other operably associated with said switch to effect the opening thereof when said members are separated, and a float in said lower bowl constructed and arranged to move said one member so as to separate said members when the level of the liquid in said lower bowl falls to a predetermined minimum.

4. In a vacuum-type coffee maker having a water heating bowl, a coffee infusion bowl and a liquid transfer tube between the bowls, an electric heater for heating said water heating bowl, a magnet on said heater controlling the energizing circuit of said heater so that when it is dropped from a first to a second position it reduces the heat applied to said bowl, an armature for holding said magnet in said first position, a lever arm attached to said armature, and a float in said water heating bowl constructed and arranged to engage said lever arm and move said armature away from said magnet so as to release said magnet to permit it to drop to said second position when the float falls to a predetermined low level in said bowl.

5. In a vacuum-type coffee maker having a water heating bowl, a coffee infusion bowl having a liquid transfer tube extending down into said water heating bowl and terminating at a point adjacent the lower wall of the water heating bowl, a heater under said water heating bowl, a magnet and an armature one of which is located in said water heating bowl and the other of which is outside of said bowl below the lower end of said tube, a float in said water heating bowl surrounding said tube so as to be guided thereby and constructed and arranged to move said one of said magnet and armature that is in said bowl with reference to said other of said magnet and armature so as to effect movement of the latter when the float falls to a predetermined low level in said bowl, and means controlled by said movement of said other of said magnet and armature for reducing the heat applied to said water heating bowl.

6. In a vacuum-type coffee maker having a water heating bowl, a coffee infusion bowl and a water transfer tube between them having one end terminating at a point adjacent the lower wall of the water heating bowl, an electric heater under said water heating bowl for applying heat to the liquid in said bowl, a switch controlling the energization of said heater, a pair of relatively movable cooperating control members for said switch consisting of a magnet and an armature constructed and arranged to control the operation of said switch so that when said magnet and armature are attracted toward each other said switch is closed and when they are separated said switch is opened, one of said members constructed and arranged to rest on said bottom wall and the other operably associated with said switch to effect the opening thereof when said members are separated, a lever pivoted to the lower end of said tube connected to said one member, and an annular float around said tube constructed and arranged to engage said lever to elevate said one member and thereby separate said members when said float falls to a predetermined low level in said water heating bowl.

7. In a coffee maker having a water heating bowl and a liquid transfer tube leading from the bowl, a heater under said bowl for heating the water therein, a magnet controlling said heater to reduce the heat applied to said bowl when moved from a first to a second controlling position, an armature in said bowl, and a float in said bowl supporting said armature and lowering it to a position where it is attracted to said magnet to cause the magnet to move to said second controlling position when the water in said bowl falls to a predetermined low level.

8. In a coffee maker having a water heating bowl and a liquid transfer tube leading from the bowl, a heater under said bowl for heating the water therein, a magnet and an armature therefor controlling said heater to reduce the heat applied to said bowl when they are moved to such positions that the magnet attracts said armature to it, one of said magnet and armature mounted below said bowl and the other in said bowl, and a float in said bowl supporting said other of said magnet and armature so as to lower it into position where the magnet and armature are attracted together when the water in said bowl falls to a predetermined low level.

9. In a vacuum-type coffee maker having a water heating bowl, a coffee infusion bowl and a liquid transfer tube connected with the infusion bowl and extending down into said water heating bowl, a heater for applying heat to said water heating bowl, an annular float of magnetic material in said water heating bowl surrounding said tube so as to be guided thereby, the position of said float being determined by the water level in said bowl, and an armature for controlling said heating means located exteriorly of said water heating bowl and movable by the attractive force of said float to cause said heating means to reduce the heat applied to said water heating bowl when said float falls to a predetermined low level in said water heating bowl due to the fall in the liquid level therein.

10. In a vacuum-type coffee maker having a water heating bowl, a coffee infusion bowl having a liquid transfer tube extending down into said water heating bowl and terminating at a point adjacent the lower wall of the water heating bowl, a heater under said water heating bowl, a magnet and an armature one of which is located in said water heating bowl and the other of which is outside of said bowl below the lower end of said tube, a float in said water heating bowl surrounding said tube so as to be guided thereby and constructed and arranged to move said one of said magnet and armature that is in said bowl with reference to said other of said magnet and armature so as to vary a condition of operation of the latter when the float falls to a predetermined low level in said bowl, and means controlled responsively to said condition for operating said heating means to reduce the heat applied to said water heating bowl when said float falls to said predetermined low level in said bowl.

WALTER R. WEEKS.